(12) United States Patent
Johnson (10) Patent No.: US 7,216,007 B2
(45) Date of Patent: May 8, 2007

(54) SYSTEM AND METHOD FOR PROVIDING DIRECT WEB ACCESS TO CONTROLLERS IN A PROCESS CONTROL ENVIRONMENT

(75) Inventor: James M. Johnson, Waterford (IE)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 11/175,834

(22) Filed: Jul. 6, 2005

(65) Prior Publication Data

US 2007/0011227 A1    Jan. 11, 2007

(51) Int. Cl.
  G05B 15/02 (2006.01)
  G05B 11/01 (2006.01)
  G05B 19/18 (2006.01)
  G05B 23/02 (2006.01)
  G06F 15/177 (2006.01)
  G06F 17/00 (2006.01)
  G06F 3/00 (2006.01)

(52) U.S. Cl. .................. 700/83; 715/700; 709/220; 709/221; 340/3.1; 340/3.9; 700/9; 700/17; 700/19; 700/65

(58) Field of Classification Search .............. 700/9, 700/17, 65, 83, 19; 340/3.1, 3.9, 988–989; 709/220–224; 702/188
See application file for complete search history.

(56) References Cited

U.S. PATENT DOCUMENTS

| 5,805,442 | A  | * | 9/1998  | Crater et al. ............... 700/9 |
| 6,061,603 | A  | * | 5/2000  | Papadopoulos et al. ....... 700/83 |
| 6,640,140 | B1 | * | 10/2003 | Lindner et al. ............ 700/18 |
| 2004/0205185 | A1 | * | 10/2004 | Leonik .................. 709/224 |
| 2006/0036967 | A1 | * | 2/2006  | Crichlow ................ 715/781 |

OTHER PUBLICATIONS

Wikipedia Definition for "Visual Basic.NET"; pp. 1-7.*

* cited by examiner

Primary Examiner—Anthony Knight
Assistant Examiner—Ronald D. Hartman, Jr.
(74) Attorney, Agent, or Firm—Munck Butrus, P.C.

(57) ABSTRACT

A controller includes an execution environment capable of executing an application for controlling a process element in a processing environment. The controller also includes a web server capable of being executed in the execution environment. The web server is also capable of providing direct web access to the controller by providing information associated with at least one of the controller and the process element over a network for display on a web browser. The information could be provided in the form of graphical images embedded in web pages or using a web service, a web form, or a smart client application. Also, the web server could be executed as a background task in the execution environment, the execution environment could represent a deterministic execution environment, and the application could represent a real-time application.

20 Claims, 6 Drawing Sheets

SYSTEM AND METHOD FOR PROVIDING DIRECT WEB ACCESS TO CONTROLLERS IN A PROCESS CONTROL ENVIRONMENT

CROSS-REFERENCE TO RELATED APPLICATIONS

This application is related to the following patent applications:

U.S. patent application Ser. No. 11/175,703 entitled "APPARATUS AND METHOD FOR DETERMINISTIC GARBAGE COLLECTION OF A HEAP MEMORY" filed on Jul. 6, 2005; and U.S. patent application Ser. No. 11/175,848 entitled "DETERMINISTIC RUNTIME EXECUTION ENVIRONMENT AND METHOD" filed on Jul. 6, 2005;

which are both hereby incorporated by reference.

TECHNICAL FIELD

This disclosure relates generally to control systems and more specifically to a system and method for providing direct web access to controllers in a process control environment.

BACKGROUND

Processing facilities are typically managed using process control systems. Among other functions, these control systems often manage the use of motors, catalytic crackers, valves, and other industrial equipment in the processing facilities. Example processing facilities include manufacturing plants, chemical plants, crude oil refineries, and ore processing plants. In these facilities, the industrial equipment typically performs actions needed to process materials in the processing facilities.

In conventional process control systems, various controllers are used to control the operation of the motors and other industrial equipment in the processing facilities. The controllers could, for example, monitor the operation of the industrial equipment, provide control signals to the industrial equipment, and generate alarms when the industrial equipment malfunctions. Conventional controllers typically lack a simple and easily accessible user interface to allow users to interact with the conventional controllers. Moreover, executing a program to provide a user interface could interfere with the other operations performed by the conventional controllers, such as when the execution of the user interface program interferes with the execution of real-time control applications.

SUMMARY

This disclosure provides a system and method for providing direct web access to controllers in a process control environment.

In one embodiment, a controller includes an execution environment capable of executing an application for controlling a process element in a processing environment. The controller also includes a web server capable of being executed in the execution environment. The web server is also capable of providing direct web access to the controller by providing information associated with at least one of the controller and the process element over a network for display on a web browser.

In particular embodiments, the information could be provided in the form of graphical images embedded in web pages or using a web service, a web form, or a smart client application. Also, the web server could be executed as a background task in the execution environment, the execution environment could represent a deterministic execution environment, and the application could represent a real-time application.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1:
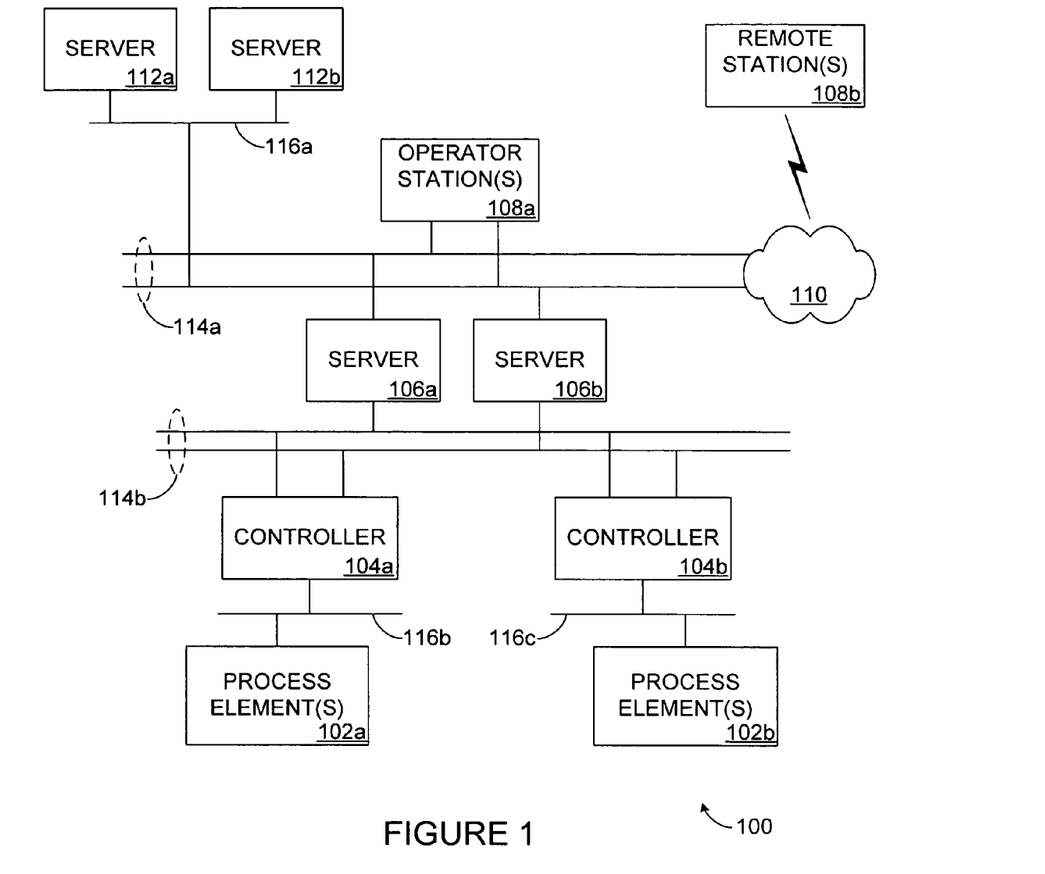
FIG. 1 illustrates an example process control system according to one embodiment of this disclosure.

FIG. 1 illustrates an example process control system 100 according to one embodiment of this disclosure. The embodiment of the process control system 100 shown in FIG. 1 is for illustration only. Other embodiments of the process control system 100 may be used without departing from the scope of this disclosure.

In this example embodiment, the process control system 100 includes one or more process elements 102a–102b. The process elements 102a–102b represent components in a processing environment that may perform any of a wide variety of functions. For example, the process elements 102a–102b could represent motors, catalytic crackers, valves, and other industrial equipment in a processing environment. The process elements 102a–102b could represent any other or additional components in any suitable processing environment. Each of the process elements 102a–102b includes any hardware, software, firmware, or combination thereof for performing one or more functions in a processing environment. In this document, the phrase "process element" refers to any component, device, or system capable of performing one or more functions to manipulate, alter, or otherwise process one or more materials in a processing environment. Also, the phrase "processing environment" refers to a collection of one or more processing elements that manipulate, alter, or otherwise process one or more materials, including manufacturing or production plants or other facilities.

Two controllers 104a–104b are coupled to the process elements 102a–102b. In this document, the term "couple" and its derivatives refer to any direct or indirect communication between two or more elements, whether or not those elements are in physical contact with one another. The controllers 104a–104b control the operation of the process elements 102a–102b. For example, the controllers 104a–104b could be capable of providing control signals to the process elements 102a–102b periodically. As a particular example, if a process element represents a motor, one of the controllers 104a–104b could provide control information to the motor once every millisecond. Each of the controllers 104a–104b includes any hardware, software, firmware, or combination thereof for controlling one or more of the process elements 102a–102b. The controllers 104a–104b could, for example, represent C300 controllers.

Two servers 106a–106b are coupled to the controllers 104a–104b. The servers 106a–106b perform various functions to support the operation and control of the controllers 104a–104b and the process elements 102a–102b. For example, the servers 106a–106b could log information collected or generated by the controllers 104a–104b, such as status information related to the operation of the process elements 102a–102b. The servers 106a–106b could also execute applications that control the operation of the controllers 104a–104b, thereby controlling the operation of the process elements 102a–102b. In addition, the servers 106a–106b could provide secure access to the controllers 104a–104b. Each of the servers 106a–106b includes any hardware, software, firmware, or combination thereof for providing access to or control of the controllers 104a–104b. The servers 106a–106b could, for example, represent personal computers (such as desktop computers) executing WINDOWS 2000 from MICROSOFT CORPORATION. In this document, the term "application" refers to one or more computer programs, sets of instructions, procedures, functions, objects, classes, instances, or related data adapted for implementation in a suitable computer language.

One or more operator stations 108a–108b are coupled to the servers 106a–106b. The operator stations 108a–108b represent computing or communication devices providing user access to the servers 106a–106b, which could then provide user access to the controllers 104a–104b and the process elements 102a–102b. For example, the operator stations 108a–108b could allow users to review the operational history of the process elements 102a–102b using information collected by the controllers 104a–104b and servers 106a–106b. The operator stations 108a–108b could also allow the users to adjust the operation of the process elements 102a–102b, controllers 104a–104b, or servers 106a–106b. Each of the operator stations 108a–108b includes any hardware, software, firmware, or combination thereof for supporting user access and control of the system 100. The operator stations 108a–108b could, for example, represent personal computers executing WINDOWS 95, WINDOWS 2000, or WINDOWS NT from MICROSOFT CORPORATION.

In this example, at least one of the operator stations 108b is a remote station. The remote station is coupled to the servers 106a–106b through a network 110. The network 110 facilitates communication between various components in the system 100. For example, the network 110 may communicate Internet Protocol (IP) packets, frame relay frames, Asynchronous Transfer Mode (ATM) cells, or other suitable information between network addresses. The network 110 may include one or more local area networks (LANs), metropolitan area networks (MANs), wide area networks (WANs), all or a portion of a global network such as the Internet, or any other communication system or systems at one or more locations.

In this example, the system 100 includes two additional servers 112a–112b. The servers 112a–112b execute various applications to control the overall operation of the system 100. For example, the system 100 could be used in a processing or production plant or other facility, and the servers 112a–112b could execute applications used to control the plant or other facility. As particular examples, the servers 112a–112b could execute applications such as enterprise resource planning (ERP), manufacturing execution system (MES), or any other or additional plant or process control applications. Each of the servers 112a–112b includes any hardware, software, firmware, or combination thereof for controlling the overall operation of the system 100.

As shown in FIG. 1, the system 100 includes various redundant networks 114a–114b and single networks 116a–116c that support communication between components in the system 100. Each of these networks 114a–114b, 116a–116c represents any suitable network or combination of networks facilitating communication between components in the system 100. The networks 114a–114b, 116a–116c could, for example, represent Ethernet networks.

In one aspect of operation, one or more of the controllers 104a–104b executes, supports, or otherwise provides access to an execution environment. The execution environment provides support for various features that applications may use during execution. For example, the execution environment could provide support for mathematical functions, input/output functions, and communication functions used by the applications. The execution environment could also support compilation of assembly code, management of a heap memory, and any other or additional functions. In this document, the phrase "managed application" refers to an application executed in the execution environment. Managed applications could, for example, include real-time applications executed by the controllers 104a–104b to control the process elements 102a–102b in the system 100. Real-time applications may represent programs that interact with an outside environment or otherwise operate in a way that is carefully timed.

Figure 2:
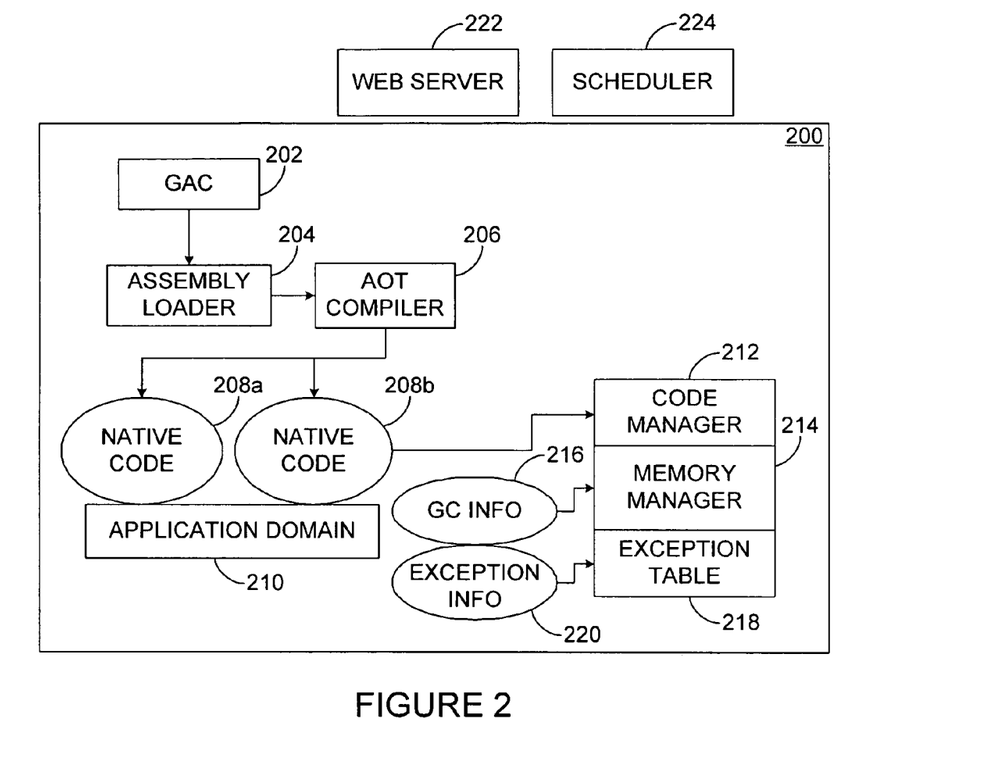
FIG. 2 illustrates an example execution environment providing direct web access to a controller in a process control system according to one embodiment of this disclosure.

In some embodiments, the execution environment used in the controllers 104a–104b to execute the managed applications is deterministic. A deterministic execution environment is an execution environment whose behavior is predictable or that can be precisely specified. One example embodiment of an execution environment is shown in FIG. 2, which is described below. Also, additional details of an example execution environment may be found in U.S. patent application Ser. No. 11/175,848 entitled "DETERMINISTIC RUNTIME EXECUTION ENVIRONMENT AND METHOD," which has been incorporated by reference.

To provide access to the controllers 104a–104b, at least one of the controllers 104a–104b includes or otherwise supports a web server. The web server could, for example, represent a background task that is executed in the controller without interfering with the execution of real-time control applications. The web server allows direct web-based user access to the controller, such as by allowing users using the operator stations 108a–108b to access the controller using standard web browsers. In this way, users may be able to more easily access and control the operation of the controller. In this document, the phrase "direct web access" refers to access via a web server (such as an embedded web server) that is directly hosted on a device (such as a controller). This may allow requests associated with the device to be routed straight to the device.

Each of the controllers 104a–104b could support any appropriate level of functionality regarding the web server. For example, in some embodiments, a controller could include a web server that only generates and provides graphical images to a user. The images could, for example, contain diagnostic information for a controller or a process element monitored by that controller. Among other things, this could allow for non-interactive monitoring of the controller or the process element(s) monitored by that controller. As a particular example, the web server executed by one of the controllers 104a–104b could represent a hypertext transfer protocol (HTTP) server capable of serving hypertext markup language (HTML) web pages containing embedded Joint Photographic Experts Group (JPEG) images.

In other embodiments, a controller could include a more complex web server that allows for greater user interaction and control of the controller. For example, the web server in a controller could provide or support web services that allow more complex information and graphics to be exchanged with users. As particular examples, the web server in a controller could support Open Connectivity (OPC) extensible Markup Language Data Access (XML-DA) services or Active Server Page .Net (ASP.Net) applications. Also, the web server in a controller could support rich or smart client applications such as applications written in C# or Visual Basic .Net (VB.NET), which are downloaded to and executed by user devices (such as the operator stations 108a–108b).

In particular embodiments, if the web server in a controller supports the use of ASP.Net, any .Net compilation functions may be disabled. In these embodiments, the .Net compilation functions could be performed elsewhere (such as on a user's device) to generate intermediate language code (such as assembly code). The assembly code is then downloaded to the controller, which compiles the code into executable code in the background of the controller. In this way, the performance of the .Net compilation functions may not interfere with the execution of real-time applications in the controller, and the execution environment may be more deterministic.

In other particular embodiments, the web server in a controller could support rich or smart client applications such as winforms. The controller itself is not required to understand winforms, and the controller could serve the winforms to a user and allow the user's device (such as one of the operator stations 108a–108b) to generate the necessary objects for the winforms.

By providing a web server in one or more of the controllers 104a–104b, users may more easily access the controllers 104a–104b. For example, users could directly access the controllers 104a–104b using any suitable networked computer or other user device. Also, the controllers 104a–104b could be accessed using standard web browsers. In addition, the web server could provide any static or dynamic content to a user, including dynamic HTML, web forms, and smart client winforms.

Although FIG. 1 illustrates one example of a process control system 100, various changes may be made to FIG. 1. For example, a control system could include any number of process elements, controllers, servers, and operator stations. Also, FIG. 1 illustrates one operational environment in which one or more controllers supporting web servers could be used. The controllers could be used in any other suitable device or system.

FIG. 2 illustrates an example execution environment 200 providing direct web access to a controller in a process control system according to one embodiment of this disclosure. The embodiment of the execution environment 200 shown in FIG. 2 is for illustration only. Other embodiments of the execution environment could be used without departing from the scope of this disclosure. Also, the execution environment 200 shown in FIG. 2 could be implemented in the controllers 104a–104b, although the execution environment 200 could be used in any other suitable device or system.

In this example embodiment, the execution environment 200 includes a global assembly cache (GAC) 202. The global assembly cache 202 represents a memory capable of storing different assembly code programs to be executed in the execution environment 200. The assembly code programs could represent the managed applications to be executed in the execution environment 200. As an example, the global assembly cache 202 could store an assembly code program capable of controlling one or more of the process elements 102a–102b of FIG. 1. The global assembly cache 202 could store multiple assembly code programs and/or different versions of the same assembly code program. The global assembly cache 202 represents any suitable storage and retrieval device or devices.

An assembly loader 204 loads assembly code into the execution environment 200 for execution. For example, the assembly loader 204 may retrieve new assembly code downloaded by a user into the global assembly cache 202. The assembly loader 204 may then load the identified assembly code into a compiler for compilation and use in the execution environment 200. The assembly loader 204 includes any hardware, software, firmware, or combination thereof for loading assembly code for compilation. The assembly loader 204 could, for example, represent a software thread executed in the background of the execution environment 200.

An ahead-of-time (AOT) compiler 206 compiles the assembly code loaded by the assembly loader 204. The AOT compiler 206 represents a load-time compiler that compiles assembly code when the assembly code is loaded. For example, the AOT compiler 206 may convert assembly code from an intermediate language to native executable code capable of being executed in the execution environment 200. Also, the AOT compiler 206 could insert instructions into the native executable code to ensure proper execution of the code in the execution environment 200. The AOT compiler 206 includes any hardware, software, firmware, or combination thereof for compiling assembly code. The AOT compiler 206 could, for example, represent a software thread executed in the background of the execution environment 200.

The AOT compiler 206 produces native executable code, such as native executable codes 208a–208b. The native executable codes 208a–208b represent executable code capable of being executed in the execution environment 200. The native executable codes 208a–208b could provide any suitable functionality in the execution environment 200, such as providing control of one or more process elements 102a–102b of FIG. 1. The native executable codes 208a–208b could provide any other or additional functionality in the execution environment 200.

One or more application domains 210 represent the domains in which one or more managed applications (such as the applications implemented by the native executable codes 208a–208b) are executed in the execution domain 200. Each application domain 210 represents any suitable domain for executing one or more managed applications. While shown as a single application domain 210 in FIG. 2, multiple application domains 210 could be used.

The assembly codes and native executable codes in the execution environment 200 are managed by a code manager 212. For example, the code manager 212 may control the loading and unloading of assembly code in the execution environment 200. As a particular example, the code manager 212 could receive a command from a user or managed application instructing the execution environment 200 to load an assembly code program. The code manager 212 could then cause the assembly loader 204 to load the assembly code into the AOT compiler 206, and the AOT compiler 206 generates native executable code that is loaded into the application domain 210. The code manager 212 could also receive a command from a user or managed application instructing the execution environment 200 to unload an assembly code program. The code manager 212 could then unload the native executable code associated with the identified assembly code from the application domain 210. The process of unloading an assembly code may include reclaiming the memory associated with that assembly code and ensuring that associations between the assembly code being unloaded and the execution environment 200 or other programs are removed. The code manager 212 includes any hardware, software, firmware, or combination thereof for managing assembly code and/or compiled code used in the execution environment 200. The code manager 212 could, for example, represent a software thread executed in the background of the execution environment 200.

The execution environment 200 also includes a memory manager 214. The memory manager 214 represents a deterministic memory manager that manages the use of a heap memory. For example, the memory manager 214 could allocate blocks of heap memory to managed applications being executed in the application domain 210. The memory manager 214 could also use garbage collection information 216 to release blocks of heap memory that are no longer being used by the managed applications. The garbage collection information 216 could, for example, be generated by a garbage collection process provided by the memory manager 214 and executed in the background of the execution environment 200. In addition, the memory manager 214 could support a defragmentation process for the heap memory. The defragmentation process could be used to combine unused blocks of heap memory into larger blocks. The memory manager 214 includes any hardware, software, firmware, or combination thereof for managing a heap memory. The memory manager 214 could, for example, represent a software thread executed in the background of the execution environment 200.

The execution environment 200 further includes an exception table 218, which stores exception information 220. The exception information 220 identifies various problems experienced in the execution environment 200. Example problems could include attempting to load assembly code that does not exist in an explicitly specified location or in the global assembly cache 202, an error during compilation of loaded assembly code, or attempting to unload assembly code not previously loaded. An application or process being executed in the execution environment 200 could generate an exception identifying a detected problem. The exception is identified by the exception information 220, which is stored in the exception table 218 for later use (such as during debugging) or for use by the application or process for automatic recovery at runtime.

An embedded web server 222 is used to allow user access to the controller implementing the execution environment 200. For example, the web server 222 could generate graphical images (such as JPEG images) using information collected by the controller and provide the graphical images embedded in HTML pages. The web server 222 could also support ASP.NET or other applications that provide more advanced web services to users. In addition, the web server 222 could be capable of downloading code to a user device (such as one of the operator stations 108a–108b), which then executes the code and interacts with the web server 222. The web server 222 includes any hardware, software, firmware, or combination thereof for providing web-based access to a controller supporting the execution environment 200. The web server 222 could, for example, represent a software thread executed in the background of the execution environment 200.

A scheduler 224 is used to schedule execution of the managed applications, such as the native executable codes 208a–208b. The scheduler 224 may also be used to schedule execution of the background tasks in the execution environment 200. The background tasks include, among other things, providing web-based access using the web server 222, heap memory management, assembly loading and unloading, and assembly compilation. For example, the scheduler 224 could support time slicing to allow multiple threads to be executed, where the threads represent the background tasks and the managed applications. The scheduler 224 includes any hardware, software, firmware, or combination thereof for scheduling the execution of applications and other tasks.

In some embodiments, the scheduler 224 and the execution environment 200 cooperate and collaborate to ensure that the managed applications and the background tasks are executed properly. For example, the scheduler 224 may control when and for how long the background tasks may be executed in the execution environment 200. As a particular example, the scheduler 224 could preempt all threads executing the managed applications and then call the execution environment 200 to execute one or more background tasks. The scheduler 224 informs the execution environment 200 of the amount of time available to perform the background tasks. The execution environment 200 guarantees that control is returned to the scheduler 224 on or before the expiration of that amount of time. While the execution environment 200 is performing a background task, managed applications that read or write data to a heap memory may not interrupt the background task. Other threads that do not access a heap memory (such as an interrupt service routine or ISR) could be allowed to interrupt a background task. Averaged over time, the scheduler 224 may provide the execution environment 200 with enough time to perform the background tasks needed for the managed applications to execute properly. As an example, the managed applications may use up to approximately 80% of the time slices available, while the remaining 20% are used by the background tasks.

This type of scheduling may impose certain requirements on the managed applications. For example, the managed applications should, over time, allow adequate processing resources to be provided to and used by the background tasks. Also, a managed application should either come to a "clean point" or use read and write barriers before transferring control to the background tasks. A "clean point" generally represents a point where a sequence of related instructions being executed for the managed application has been completed, rather than a point that occurs during execution of the sequence of related instructions. As an example, a managed application should complete accessing data in a data structure or file when the transfer of control occurs, rather than being in the middle of reading data or writing data. A read or write barrier is used when the managed application is not at a clean point when the transfer of control occurs. The read or write barrier generally represents a marker or flag used to inform the background tasks that particular data is currently being used by a managed application. This may, for example, prevent the background tasks from moving the data during defragmentation or discarding the data during garbage collection.

In some embodiments, the various components shown in FIG. 2 operate over a platform/operating system abstraction layer. The platform/operating system abstraction layer logically separates the execution environment 200 from the underlying hardware platform or operating system. In this way, the execution environment 200 may be used with different hardware platforms and operating systems without requiring the execution environment 200 to be specifically designed for a particular hardware platform or operating system.

Although FIG. 2 illustrates one example of an execution environment 200 providing direct web access to a controller in a process control system, various changes may be made to FIG. 2. For example, the functional division shown in FIG. 2 is for illustration only. Various components in FIG. 2 could be combined or omitted and additional components could be added according to particular needs.

FIGS. 3A through 3E illustrate example displays provided through direct web access to a controller in a process control system according to one embodiment of this disclosure. In particular, FIGS. 3A through 3E illustrate a web browser used by a user to access different web pages produced by a web server in a controller. For ease of explanation, the displays shown in FIGS. 3A through 3E are described as being generated by a web server executed using the execution environment 200 of FIG. 2 in the controller 104a of FIG. 1. Any other display could be generated by the web server, and the web server could operate in any other execution environment and in any other device, system, or environment.

Figure 3A:
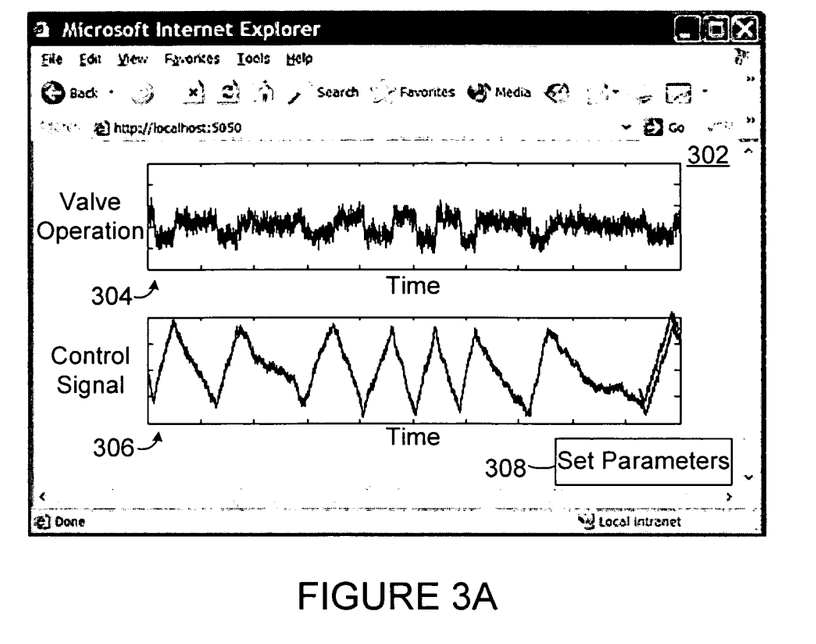
FIGS. 3A through 3E illustrate example displays provided through direct web access to a controller in a process control system according to one embodiment of this disclosure.

As shown in FIG. 3A, a web browser is displaying a web page 302 generated by the controller 104a. In this example, the controller 104a is generating a web page 302 identifying the operation of a valve in the process control system 100. The web page 302 includes two graphs 304–306. In this particular example, the graph 304 identifies the historical operation of the valve, such as by identifying how the valve opens and closes over time. The graph 306 identifies the control signals provided to the valve by the controller 104a, such as by identifying the control signals that cause the valve to open and close over time. The web page 302 may also includes a button 308. The button 308 may be selected by a user viewing the web page 302. In this example, the button 308 allows the user to access another web page, where the user may establish any suitable operational parameters for the valve.

Figure 3B:
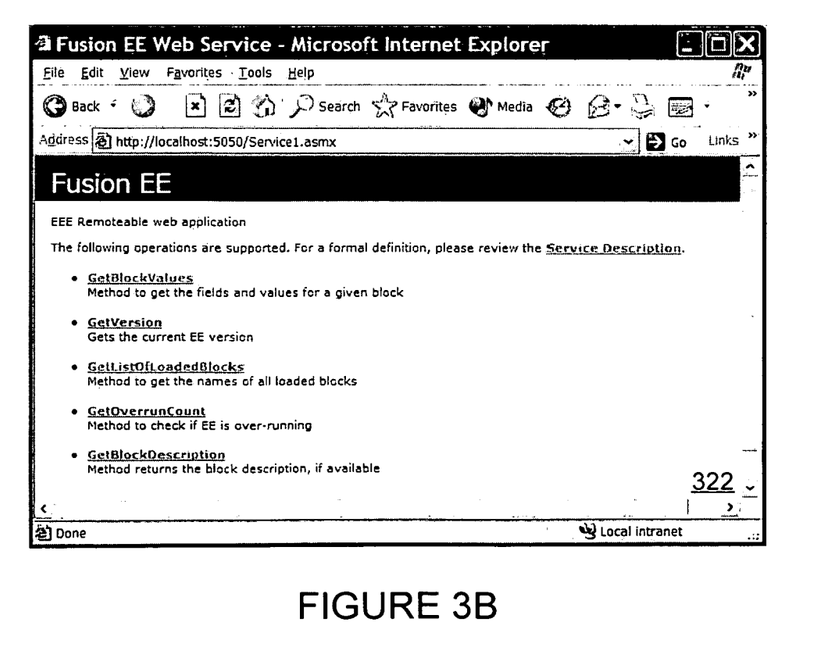

In FIG. 3B, a web browser is displaying a web page 322 generated by the controller 104a. In this example, the controller 104a is generating a web page 322 identifying different web services available to a user. In this particular example, the execution environment 200 may host applications or modules of applications in the form of blocks, which can be created graphically or using a text-based language. Among other things, the web page 322 allows a user to view the blocks currently being executed and to view the description and run time state (referred to as a "value") of the blocks. The web page 322 also allows a user to view information about the execution environment 200 (such as a version and over-run count).

Figure 3C:
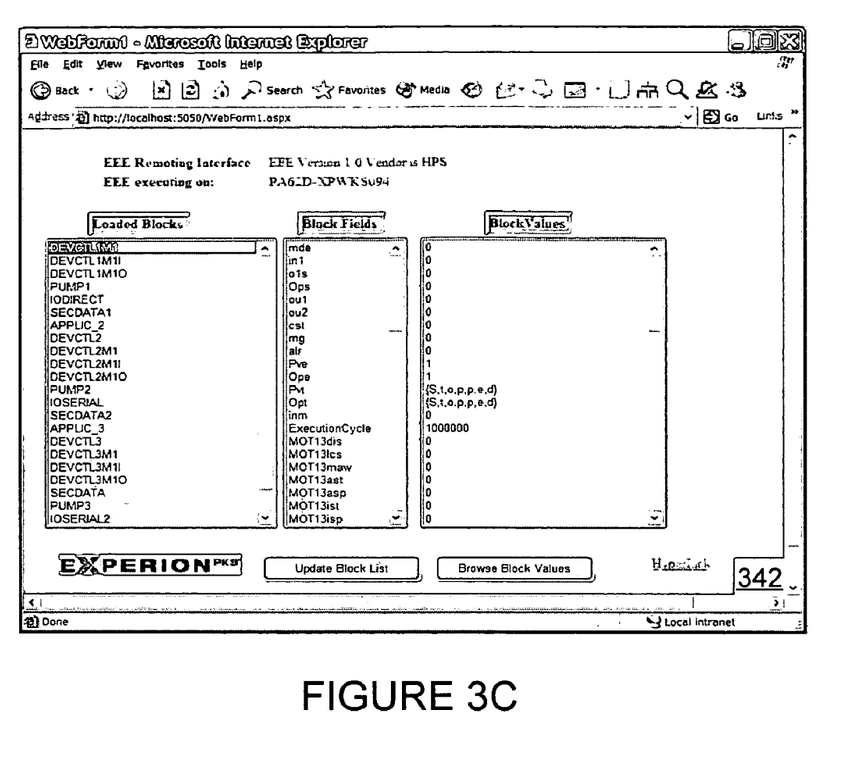

In FIG. 3C, a web browser is displaying a web page 342 generated by the controller 104a. In this example, the controller 104a is generating a web page 342 that includes a web form. The web form identifies the loaded blocks, the fields in those blocks, and the values in those block fields for a particular controller.

Figure 3D:
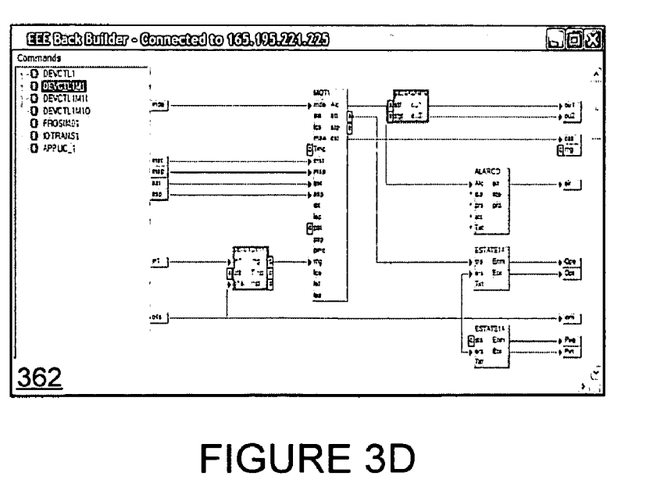

In FIG. 3D, a web browser is displaying a web page 362 generated by the controller 104a. In this example, the controller 104a is generating a web page 362 that includes a back builder function. A back builder represents a web-based solution used to reverse engineer a block configuration. The configuration may then be made available for viewing, or configuration changes may be implemented without the need for an entire build environment. In this example, the back builder function could be provided using smart client winforms.

Figure 3E:
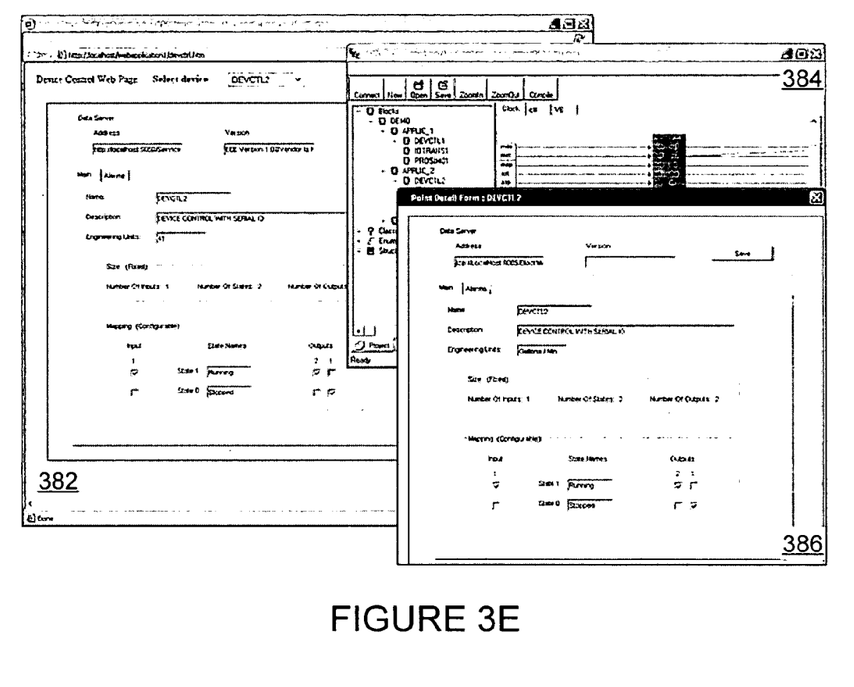

In FIG. 3E, a web browser is displaying a web page 382 generated by the controller 104a, and two additional forms 384–386 are provided to a user. In this example, the form 386 may be provided to the user in response to the user's selection of a block in the form 384. As shown in FIG. 3E, the web page 382 is displaying a form that is similar to the form 386. This illustrates that web forms may be reused, such as by reusing the forms in a web browser (such as INTERNET EXPLORER by MICROSOFT) and a winform for a building tool.

The web server 222 executed in the execution environment 200 of the controller 104a may generate the web pages shown in FIGS. 3A through 3E in any suitable manner. For example, the web server 222 could be executed during certain time slices (interleaved with time slices used by managed applications and other background tasks). During the time slices, the web server 222 could generate images (such as the graphs 304–306 in FIG. 3A) using data collected by the controller 104a. When a request for web-based access to the controller 104a is received, the web server 222 could generate the web page (such as web page 302) containing the previously generated images, and the web page is then provided to the user requesting the web-based access. This represents one possible way in which the web server 222 could generate a web page. The web server 222 could use any other suitable technique, including generating the images or other contents in response to the request, rather than before the request is received.

Although FIGS. 3A through 3E illustrate examples of displays provided through direct web access to a controller in a process control system, various changes may be made to FIGS. 3A through 3E. For example, the contents of the web pages are for illustration only. The controller 104a could generate any other or additional web pages containing any suitable content. Also, all user input mechanisms could be omitted from a web page, and the web page could only passively present information to a user without supporting any additional interaction with the user.

Figure 4:
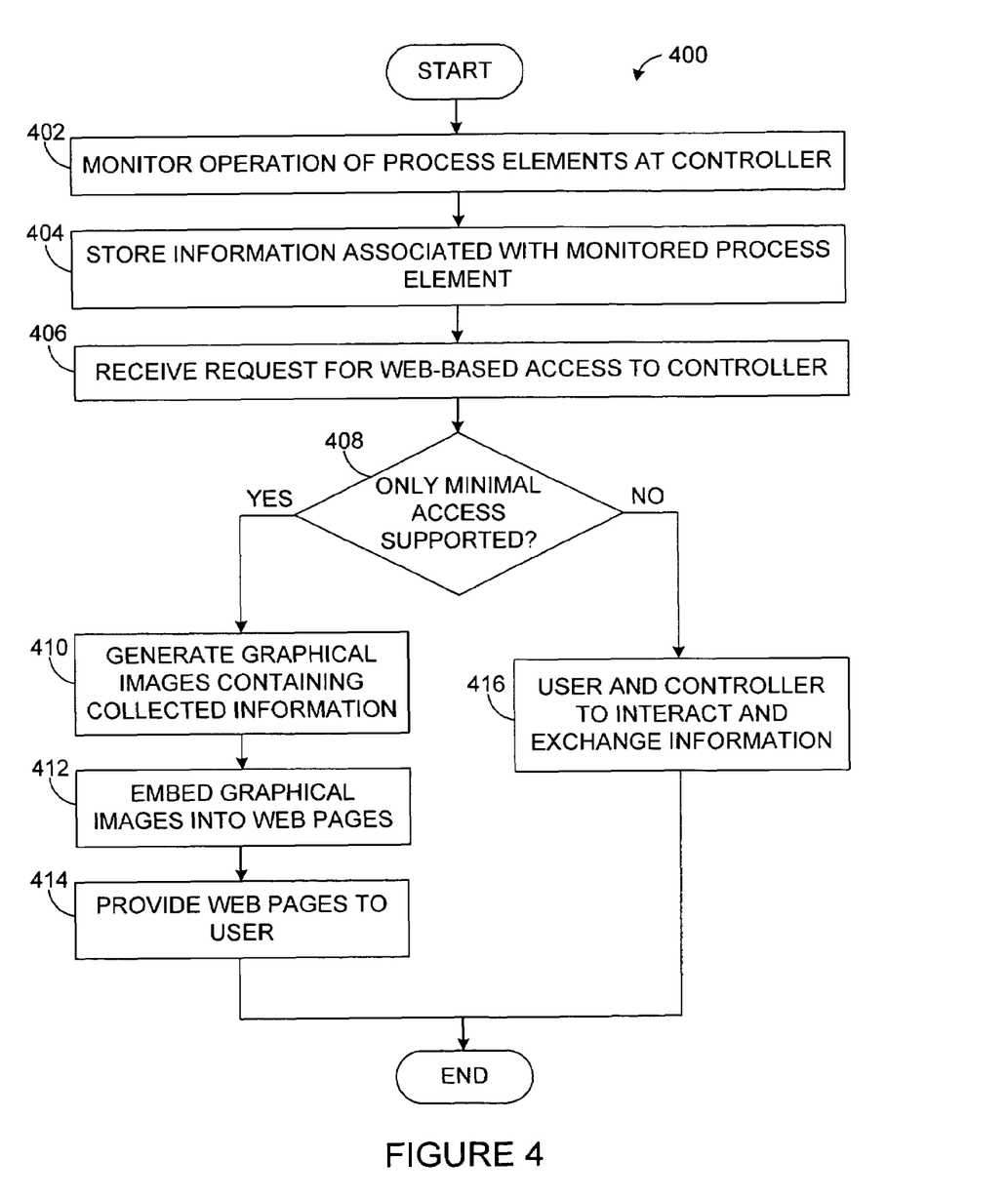
FIG. 4 illustrates an example method for providing direct web access to a controller in a process control system according to one embodiment of this disclosure.

FIG. 4 illustrates an example method 400 for providing direct web access to a controller in a process control system according to one embodiment of this disclosure. For ease of explanation, the method 400 shown in FIG. 4 is described as being performed in the execution environment 200 of FIG. 2 within the controller 104a of FIG. 1. The method 400 could be used in any other execution environment and in any other device, system, or environment.

The controller 104a monitors the operation of one or more process elements 102a at step 402. This may include, for example, the controller 104a collecting information (such as diagnostic information) about the operation of the process elements 102a. As a particular example, this may include the controller 104a collecting information about the operating parameters of the process elements 102a. This may also include the controller 104a generating control signals to control the operation of the process elements 102a, where the collected information includes information about the generated control signals.

The controller 104a stores information associated with the monitored process elements 102a at step 404. This may include, for example, the controller 104a storing information identifying the operating parameters of the process elements 102a and the control signals generated by the controller 104a. The information may be stored in any suitable location, such as a memory internal to the controller 104a or in a database external to the controller 104a.

The controller 104a receives a request for web-based access to the controller 104a at step 406. This may include, for example, the controller 104a receiving information from one of the operator stations 108a–108b indicating that a user is attempting to access the controller 104a using a web browser. This may also include the controller 104a invoking execution of the web server 222.

If the controller 104a supports only minimal access at step 408, the controller 104a generates one or more graphical images at step 410. This may include, for example, the web server 222 generating one or more JPEG images or other images using the information collected by the controller 104a. As a particular example, this may include the web server 222 generating graphical images representing time plots of the operating parameters and control signals used by the monitored process elements 102a.

The controller 104a embeds the graphical images into one or more web pages at step 412. This may include, for example, the web server 222 generating one or more HTML web pages that contain the generated JPEG images or other images.

The controller 104a provides the generated web pages to a user at step 414. This may include, for example, the web server 222 communicating the generated HTML web pages to an operator station 108a or 108b using HTTP. At this point, the user could take any suitable action, such as reviewing the diagnostic information in the graphical images. The user could also review the operation of the process elements 102a and identify potential problems with the process elements 102a.

If the controller 104a supports more than minimal access at step 408, the controller 104a and the user interact and exchange information at step 416. This may include, for example, the web server 222 providing the collected information and other information to the user in any suitable manner (including, but not limited to, using graphical images). This could also include the user providing information to the web server 222, where the provided information is used to alter the operation of the controller 104a. In addition, this could include the web server 222 providing code (such as C# or VB.NET code) to the user's operator station for execution. The user and the web server 222 could interact using any suitable mechanism, including web forms and smart client winforms.

Although FIG. 4 illustrates one example of a method 400 for providing direct web access to a controller in a process control system, various changes may be made to FIG. 4. For example, the web server supported in the controller 104a could only allow minimal access to the controller 104a (so steps 408 and 416 could be skipped) or only allow more than minimal access to the controller 104a (so steps 408–414 could be skipped).

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The term "controller" means any device, system, or part thereof that controls at least one operation. A controller may be implemented in hardware, firmware, software, or some combination of at least two of the same. The functionality associated with any particular controller may be centralized or distributed, whether locally or remotely.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A controller, comprising:
an execution environment capable of executing an application for controlling a process element in a processing environment; and
a web server capable of being executed as a background task in the execution environment, the web server also capable of providing direct web access to the controller by providing information associated with at least one of the controller and the process element over a network for display on a web browser; and
a scheduler capable of scheduling execution of the application and calling the execution environment to allow the execution environment to execute a plurality of background tasks including the web server, the scheduler capable of informing the execution environment of an amount of time provided to the execution environment for executing one or more of the background tasks, the execution environment capable of guaranteeing that control is returned to the scheduler on or before expiration of the identified amount of time.

2. The controller of claim 1, wherein the web server is capable of providing the information by:
generating a graphical image containing at least some of the information associated with at least one of the controller and the process element; and
providing a web page comprising the graphical image to the web browser over the network.

3. The controller of claim 2, wherein:
the web server comprises a hypertext transfer protocol server;
the graphical image comprises a Joint Photographic Experts Group image; and
the web page comprises a hypertext markup language web page.

4. The controller of claim 1, wherein the web server is capable of providing the information by interacting with a user over the network using one or more of: a web service, a web form, and a smart client application in conjunction with the web browser.

5. The controller of claim 4, wherein:
the web service comprises at least one of: an eXtensible Markup Language service and an Active Server Page .Net application; and
the smart client application comprises at least one of: a C# application and a Visual Basic .Net application.

6. The controller of claim 1, wherein the execution environment is capable of at least one of: executing multiple applications and controlling multiple process elements.

7. The controller of claim 1, wherein:
the execution environment comprises a deterministic execution environment; and
the application comprises a real-time application.

8. The controller of claim 1, wherein the information associated with at least one of the controller and the process element comprises information associated with one or more of: operating parameters of the process element, control signals generated by the controller, diagnostics information associated with the process element, and diagnostics information associated with the controller.

9. The controller of claim 1, wherein the scheduler is further capable of preempting execution of the application in order to call the execution environment.

10. A method, comprising:
executing, in an execution environment within a controller, an application for controlling a process element in a processing environment;
executing a web server as a background task in the execution environment;
providing direct web access to the controller using the web server, wherein providing the direct web access comprises providing information associated with at least one of the controller and the process element over a network for display on a web browser; and
scheduling execution of the application and calling the execution environment to allow the execution environment to execute a plurality of background tasks including the web server using a scheduler, wherein calling the execution environment comprises informing the execution environment of an amount of time provided to the execution environment for executing one or more of the background tasks, the execution environment capable of guaranteeing that control is returned to the scheduler on or before expiration of the identified amount of time.

11. The method of claim 10, wherein providing the information over the network comprises:
generating a graphical image containing at least some of the information associated with at least one of the controller and the process element; and
providing a web page comprising the graphical image to the web browser over the network.

12. The method of claim 11, wherein:
the web server comprises a hypertext transfer protocol server;
the graphical image comprises a Joint Photographic Experts Group image; and
the web page comprises a hypertext markup language web page.

13. The method of claim 10, wherein providing the information over the network comprises interacting with a user over the network using one or more of: a web service, a web form, and a smart client application in conjunction with the web browser.

14. The method of claim 13, wherein:
the web service comprises at least one of: an eXtensible Markup Language service and an Active Server Page .Net application; and
the smart client application comprises at least one of: a C# application and a Visual Basic .Net application.

15. The method of claim 10, wherein:
the execution environment comprises a deterministic execution environment; and
the application comprises a real-time application.

16. The method of claim 10, wherein calling the execution environment comprises preempting execution of the application.

17. A computer program embodied on a computer readable medium and operable to be executed by a processor, the computer program comprising computer readable program code for:
executing, in an execution environment within a controller, an application for controlling a process element in a processing environment;
executing a web server as a background task in the execution environment, the web server capable of providing direct web access to the controller by providing information associated with at least one of the controller and the process element over a network; and
scheduling execution of the application and calling the execution environment to allow the execution environment to execute a plurality of background tasks including the web server, wherein calling the execution environment comprises informing the execution environment of an amount of time provided to the execution environment for executing one or more of the background tasks, the execution environment capable of guaranteeing that control is returned to a scheduler on or before expiration of the identified amount of time.

18. The computer program of claim 17, wherein:
the execution environment comprises a deterministic execution environment.

19. The computer program of claim 17, wherein the computer readable program code for executing the web server comprises computer readable program code for:
generating a graphical image containing at least some of the information associated with at least one of the controller and the process element; and
providing a web page comprising the graphical image to a web browser over the network.

20. The computer program of claim 17, wherein the computer readable program code for executing the web server comprises computer readable program code for interacting with a user over the network using one or more of: a web service, a web form, and a smart client application in conjunction with the web browser.

* * * * *